(12) United States Patent
Takashima et al.

(10) Patent No.: US 11,171,778 B2
(45) Date of Patent: Nov. 9, 2021

(54) KEY SHARING DEVICE, KEY SHARING METHOD, AND COMPUTER READABLE MEDIUM

(71) Applicant: Mitsubishi Electric Corporation, Tokyo (JP)

(72) Inventors: Katsuyuki Takashima, Tokyo (JP); Atsushi Fujioka, Yokohama (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/642,782

(22) PCT Filed: Jun. 4, 2018

(86) PCT No.: PCT/JP2018/021370
§ 371 (c)(1),
(2) Date: Feb. 27, 2020

(87) PCT Pub. No.: WO2019/077796
PCT Pub. Date: Apr. 25, 2019

(65) Prior Publication Data
US 2021/0083854 A1    Mar. 18, 2021

(30) Foreign Application Priority Data
Oct. 19, 2017  (JP) .............................. JP2017-202581

(51) Int. Cl.
*H04L 9/08*    (2006.01)
*G06N 10/00*   (2019.01)
(52) U.S. Cl.
CPC ............. *H04L 9/088* (2013.01); *G06N 10/00* (2019.01)

(58) Field of Classification Search
USPC ........ 713/171, 150, 163, 181; 726/2, 21, 36; 380/255, 264, 276
See application file for complete search history.

(56) References Cited

U.S. PATENT DOCUMENTS 8,301,883 B2 * 10/2012 Sundaram ............. H04L 63/306
                                                         713/163
8,850,203 B2 *  9/2014 Sundaram ............. H04L 9/0825
                                                         713/169

(Continued)

FOREIGN PATENT DOCUMENTS

JP    2015-126485 A    7/2015

OTHER PUBLICATIONS

De Feo et al., "Towards quantum-resistant cryptosystems from supersingular elliptic curve isogenies", J. Math. Crypt., vol. 8, No. 3, 2014, pp. 209-247.

(Continued)

*Primary Examiner* — Sharif E Ullah
(74) *Attorney, Agent, or Firm* — Birch, Stewart, Kolasch & Birch, LLP

(57) ABSTRACT

An objective is to enable conversion of a key sharing scheme having asymmetricity into a key sharing scheme with an authentication function. In a key sharing device, a key selection unit selects, out of two static keys of different classifications, one static key being different from a static key of a key-sharing counterpart. A temporary key generation unit generates a temporary key of the same classification as the static key selected by the key selection unit. A shared key generation unit generates a shared key using the static key selected by the key selection unit and a temporary key generated by the counterpart.

4 Claims, 10 Drawing Sheets

(56) References Cited

U.S. PATENT DOCUMENTS

| | | | | |
|---|---|---|---|---|
| 9,276,740 | B2* | 3/2016 | Nix | H04L 9/3066 |
| 9,351,162 | B2* | 5/2016 | Nix | H04W 12/35 |
| 2003/0182554 | A1* | 9/2003 | Gentry | H04L 9/002 |
| | | | | 713/171 |
| 2007/0090996 | A1* | 4/2007 | Wang | H04L 67/12 |
| | | | | 342/463 |
| 2008/0263363 | A1* | 10/2008 | Jueneman | H04L 63/061 |
| | | | | 713/184 |
| 2015/0188704 | A1* | 7/2015 | Takenaka | H04L 9/3236 |
| | | | | 713/171 |
| 2018/0343127 | A1* | 11/2018 | Campagna | H04L 9/0825 |

OTHER PUBLICATIONS

Fujioka et al., "Characterization of Strongly Secure Authenticated Key Exchanges without NAXOS Technique", IEICE Translations Fundamentals, vol. E96-A, No. 6, Jun. 2013, pp. 1088-1099.

Fujioka et al., "Strongly Secure Authenticated Key Exchange from Factoring, Codes, and Lattices", preliminary version appeared in PKC, 2012, pp. 1-33.

Fujioka et al., "Supersingular Isogeny Diffie-Hellman Authenticated Key Exchange", 2018 Symposium on Cryptography and Information Security (SCIS 2018), 2B4-2, Jan. 23, 2018, pp. 1-8.

Galbraith et al., "On the Security of Supersingular Isogeny Cryptosystems", ASIACRYPT, 2016, pp. 1-20.

International Search Report issued in PCT/JP2018/021370 (PCT/ISA/210), dated Sep. 4, 2018.

Tanenbaum et al., "Computer Networks", Pearson, The 5th Edition of Computer Network, Sep. 17, 2013, pp. 798-800 (Total No. pp. 1-5).

* cited by examiner

Fig. 3

$SSEC_p := \{\text{supersingular elliptic curve } E \text{ over } \mathbb{F}_{p^2}$ with $E(\mathbb{F}_{p^2}) \cong (\mathbb{Z}/(p \pm 1)\mathbb{Z})^2 \supseteq (\mathbb{Z}/L_A^{e_A}\mathbb{Z})^2 \oplus (\mathbb{Z}/L_B^{e_B}\mathbb{Z})^2\}$, $SSEC_{p,A} := \{(E; P'_B, Q'_B) \mid E \in SSEC_p, (P'_B, Q'_B) : \text{basis of } E[L_B^{e_B}]\}$, $SSEC_{p,B} := \{(E; P'_A, Q'_A) \mid E \in SSEC_p, (P'_A, Q'_A) : \text{basis of } E[L_A^{e_A}]\}$, $g^a := (E_A; \phi_A(P_B), \phi_A(Q_B)) \in SSEC_{p,A}$, where $R_A = m_A P_A + n_A Q_A$, $\phi_A : E \to E_A = E/\langle R_A \rangle$, $g^b := (E_B; \phi_B(P_A), \phi_B(Q_A)) \in SSEC_{p,B}$, where $R_B = m_B P_B + n_B Q_B$, $\phi_B : E \to E_B = E/\langle R_B \rangle$, $(g^b)^a := j(E_{BA})$ where $R_{BA} = m_A \phi_B(P_A) + n_A \phi_B(Q_A)$, $\phi_{BA} : E_B \to E_{BA} = E_B/\langle R_{BA} \rangle$, $(g^a)^b := j(E_{AB})$ where $R_{AB} = m_B \phi_A(P_B) + n_B \phi_A(Q_B)$, $\phi_{AB} : E_A \to E_{AB} = E_A/\langle R_{AB} \rangle$.

Fig. 9

KEY SHARING DEVICE 10A     KEY SHARING DEVICE 10B $A_1 = g^{a_1}$     $B_1 = g^{b_1}$ $A_2 = g^{a_2}$     $B_2 = g^{b_2}$ $X = g^x$ $\xrightarrow{X}$ $Y = g^y$ $\xleftarrow{Y}$ $Z_1 = Y^{a_1}$     $Z_1 = A_1^y$ $Z_2 = B_2^x$     $Z_2 = X^{b_2}$ $Z_3 = B_2^{a_1}$     $Z_3 = A_1^{b_2}$ $Z_4 = Y^x$     $Z_4 = X^y$ $K = H(\Pi, Z_1, Z_2, Z_3, Z_4, A, B, X, Y)$

KEY SHARING DEVICE, KEY SHARING METHOD, AND COMPUTER READABLE MEDIUM

TECHNICAL FIELD

The present invention relates to a technique for sharing a key between two parties.

BACKGROUND ART

Quantum computers are being developed worldwide. As a cryptography scheme capable of maintaining security against the advent of the quantum computers, a cryptography using an isogeny has been proposed.

Non-Patent Literature 1 describes a Biclique conversion scheme that converts a 1-round Diffie-Hellman (to be referred to as DH hereinafter) key sharing scheme into a scheme with an authentication function.

CITATION LIST

Non-Patent Literature

Non-Patent Literature 1: Fujioka, A. I.: Characterization of strongly secure authenticated key exchanges without NAXOS technique. IEICE Transactions 96-A (6), 1088-1099 (2013), a preliminary version of this paper appeared in IWSEC 2011 (2011)

Non-Patent Literature 2: De Feo, L., Jao, D., Plut, J.: Towards quantum-resistant cryptosystems from supersingular elliptic curve isogenies. J. Math. Crypt. 8(3), 209-247 (2014)

SUMMARY OF INVENTION

Technical Problem

The DH key sharing scheme is not quantum-resistant. Conventionally, there was no quantum-resistant 1-round key sharing scheme with an authentication function.

As a candidate technique for constructing a quantum-resistant 1-round key sharing scheme with an authentication function, a supersingular isogeny DH (to be referred to as SIDH hereinafter) key sharing scheme (see Non-Patent Literature 2) is available. While studies have been made vigorously on the SIDH key sharing scheme lately, a method of converting the SIDH key sharing scheme into a key sharing scheme with an authentication function is not yet known due to asymmetricity of the SIDH key sharing scheme.

It is an objective of the present invention to enable conversion of a key sharing scheme having asymmetricity into a key sharing scheme with an authentication function.

Solution to Problem

A key sharing device according to the present invention includes:

a key selection unit to select one static key out of two static keys; and a key generation unit to generate a shared key to be shared with a counterpart, using the static key selected by the key selection unit.

Advantageous Effects of Invention

According to the present invention, a shared key is generated with using one static key selected out of two static keys. This enables conversion of a key sharing scheme having asymmetricity into a key sharing scheme with an authentication function.

BRIEF DESCRIPTION OF DRAWINGS

FIG. 3 is an explanatory diagram of notation.

FIG. 9 is a diagram illustrating an algorithm of the key sharing process according to Embodiment 1.

DESCRIPTION OF EMBODIMENTS

Embodiment 1

Embodiment 1 describes an SIDH key sharing scheme as an example of a key sharing scheme having asymmetricity.

\*\*\* Description on Notation \*\*\*

Notation employed below will now be described. The SIDH key sharing scheme will be described first, and then the notation will be described.

Note that there are restrictions on use of subscripts and superscripts in the text. Hence, in the following text, "_" is used as a symbol to represent a subscript, and "^" is used as a symbol to represent a superscript. Subscripts and Superscripts that cannot be expressed properly in the text are represented with using these symbols. For example, N_i represents $N_i$ and N^i represents $N^i$.

<SIDH Key Sharing Scheme>

The SIDH key sharing scheme will be described with referring to FIGS. 1 and 2. Assume that Alice and Bob perform key sharing.

With regard to two small primes $L_A$ and $L_B$ (for example, $L_A=2$, $L_B=3$) and a small value f, a large prime p is selected such that Formula 11 is satisfied.

[Formula 11]

$$p \pm 1 = f \cdot L_A^{e_A} L_B^{e_B} \quad (1)$$

$$\text{where } L_A^{e_A} \sim L_B^{e_B} = 2^{\Theta(\lambda)} \quad (2)$$

The values $e_A$ and $e_B$ are selected such that equation (2) in Formula 11 is established. In Formula 11, the symbol $\Theta$ is a Landau symbol, representing a value that is fixed from upper and lower sides asymptotically. The symbol $\lambda$ is a security parameter.

A supersingular elliptic curve E defined over a finite field $F\_\{p^2\}$ with an order $p^2$ and having a rational point group indicated in Formula 12 is selected.

$$(\mathbb{Z}/(p\pm 1)\mathbb{Z})^2 \supseteq (\mathbb{Z}/L_A^{e_A}\mathbb{Z})^2 \oplus (\mathbb{Z}/L_B^{e_B}\mathbb{Z})^2 \quad \text{[Formula 12]}$$

An isogeny $\phi_A$ with a kernel of an order $L_A\^\{e_A\}$ and an isogeny $\phi_B$ with a kernel of an order $L_B\^\{e_B\}$ are used. For the isogeny $\phi_A$, its kernel is given as Ker $(\phi_A)=<R_A>$. For the isogeny $\phi_B$, its kernel is given as Ker $(\phi_B)=<R_B>$. An isogeny having $\phi_B$ ($R_A$) as its kernel is given as $\phi_{BA}$. An isogeny having $\phi_A$ ($R_B$) as its kernel is given as $\phi_{AB}$.

Figure 1:
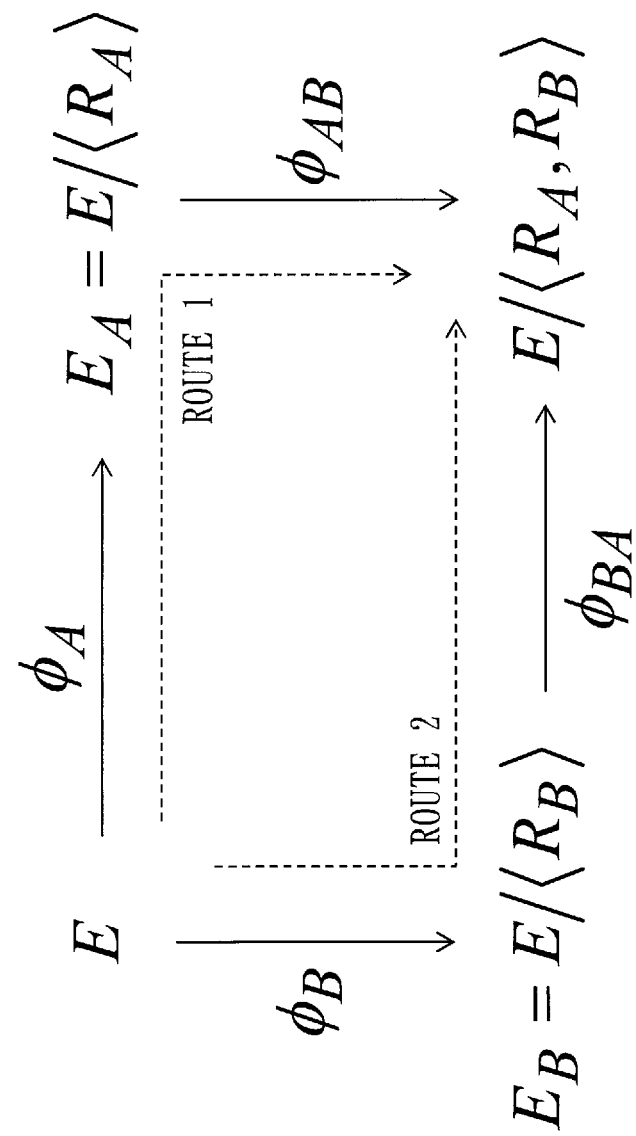
FIG. 1 is an explanatory diagram of an SIDH key sharing scheme.

Then, the relationship indicated in FIG. 1 is established. That is, a supersingular elliptic curve $E_A=E/<R_A>$ is obtained from the supersingular elliptic curve E by the isogeny $\phi_A$, and a supersingular elliptic curve $E/<R_A, R_B>$ is obtained from the supersingular elliptic curve $E_A$ by the isogeny $\phi_{AB}$ (route 1). Also, a supersingular elliptic curve $E_B=E/<R_B>$ is obtained from the supersingular elliptic curve E by the isogeny $\phi_B$, and a supersingular elliptic curve $E/<R_A, R_B>$ is obtained from the supersingular elliptic curve $E_B$ by the isogeny $\phi_{BA}$ (route 2).

Points $P_A$, $Q_A$, $P_B$, and $Q_B$ on the supersingular elliptic curve E indicated in Formula 13 are selected as generators. The supersingular elliptic curve E, the generators $P_A$, $Q_A$, $P_B$, and $Q_B$, and the values $L_A$, $L_B$, $e_A$, and $e_B$ are taken as public parameters.

$$E[L_A^{e_A}]=\langle P_A, Q_A \rangle,$$

$$E[L_B^{e_B}]=\langle P_B, Q_B \rangle,$$

Also, a secret key space for Alice and a secret key space for Bob are respectively given as $SK_A$ and $SK_B$ indicated in Formula 14.

$$SK_A:=\{(m_A,n_A)\in(\mathbb{Z}/L_A^{e_A}\mathbb{Z})^2 | \text{ not both divisible by } L_A\},$$

$$SK_B:=\{(m_B,n_B)\in(\mathbb{Z}/L_B^{e_B}\mathbb{Z})^2 | \text{ not both divisible by } L_B\},$$

Figure 2:
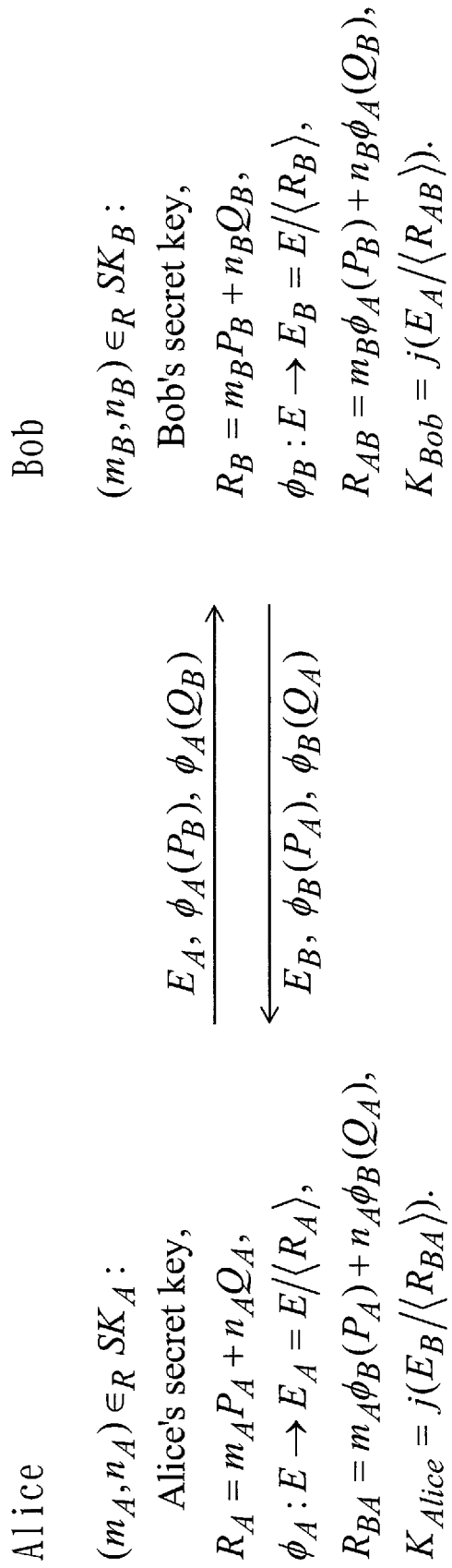
FIG. 2 is a diagram illustrating an algorithm of the SIDH key sharing scheme.

As indicated in FIG. 2, Alice calculates $R_A=m_A P_A+n_A Q_A$ using a secret key $(m_A, n_A)$ randomly selected from the secret key space $SK_A$. Alice calculates the supersingular elliptic space $E_A$ and the isogeny $\phi_A$ using $R_A$. Then, Alice transmits $\phi_A(P_B)$ and $\phi_A(Q_B)$ calculated with using the supersingular elliptic space $E_A$ and the isogeny $\phi_A$ to Bob.

Likewise, Bob calculates $R_B=m_B P_B+n_B Q_B$ using a secret key $(m_B, n_B)$ randomly selected from the secret key space $SK_B$. Bob calculates the supersingular elliptic space $E_B$ and the isogeny $\phi_B$ using $R_B$. Then, Bob transmits $\phi_B(P_A)$ and $\phi_B(Q_A)$ calculated with using the supersingular elliptic space $E_B$ and the isogeny B to Alice.

Alice calculates $R_{BA}=m_A\phi_B(P_A)+n_A\phi_B(Q_A)$ using the secret key $(m_A, n_A)$, and $\phi_B(P_A)$ and $\phi_B(Q_A)$ which are transmitted by Bob. Alice calculates a shared key $K_{Alice}=j(E_B/<R_{BA}>)$ from $R_{BA}$ and the supersingular elliptic space $E_B$ which is transmitted by Bob. Note that j is a j-invariant.

Likewise, Bob calculates $R_{AB}=m_B \phi_A(P_B)+n_B\phi_A(Q_B)$ using the secret key $(m_B, n_B)$, and $\phi_A(P_B)$ and $\phi_A(Q_B)$ which are transmitted by Alice. Bob calculates a shared key $K_{Bob}=j(E_A/<R_{AB}>)$ from $R_{AB}$ and the supersingular elliptic space $E_A$ which is transmitted by Alice.

That is, of the two key-sharing parties, one (Bob) performs calculation of route 1 of FIG. 1 and the other (Alice) performs calculation of route 2 of FIG. 1.

Note that $<m_A\phi_B (P_A)+n_A\phi_B (Q_A)>=<\phi_B (R_A)>=\ker\phi_{BA}$ and that $<m_B\phi_A (P_B)+n_B\phi_A (Q_B)>=<\phi_A (R_B)>=\ker\phi_{AB}$. Hence, an equation $K_{Alice}=j (E_B/\ker\phi_{BA})=j (E/<R_A, R_B>)=j (E_A/\ker\phi_{AB})=K_{Bob}$ for the j-invariant is established. Therefore, $K=K_{Alice}=K_{Bob}$ is the shared key.

The public parameters $P_A$ and $Q_A$ and the secret key space $SK_A$, which are employed by Alice, are elements based on exponentiation of $L_A$. The public parameters $P_B$ and $Q_B$ and the secret key space $SK_B$, which are employed by Bob, are elements based on exponentiation of $L_B$. Hence, the public parameters $P_A$ and $Q_A$ and the secret key space $SK_A$, and the public parameters $P_B$ and $Q_B$ and the secret key space $SK_B$, are elements of different classifications. Alice and Bob need to employ elements of different classifications. Alice and Bob cannot perform key sharing with each other using elements of the same classification.

When two parties that perform key sharing with each other use different information in this manner, this situation is called asymmetry. That is, the SIDH key sharing scheme has asymmetricity.

<Notation>

A notation for representing the SIDH key sharing method in a simple and clear manner will be described with referring to FIG. 3.

The supersingular elliptic curve E and generators $P_A$, $Q_A$, $P_B$, and $Q_B$, which are included in the public parameters, are denoted as "g". The secret key $(m_A, n_A)$ of Alice is denoted as "a". The secret key $(m_B, n_B)$ of Bob is denoted as "b".

A set of supersingular elliptic curves E described above is denoted as $SSEC_P$.

Sets of the above-described supersingular elliptic curves E with an auxiliary torsion basis are denoted as $SSEC_{P,A}$ and $SSEC_{P,A}$. $SSEC_{P,A}$ represents a set of information that Alice transmits to Bob. $SSEC_{P,B}$ represents a set of information that Bob transmits to Alice.

Figure 4:
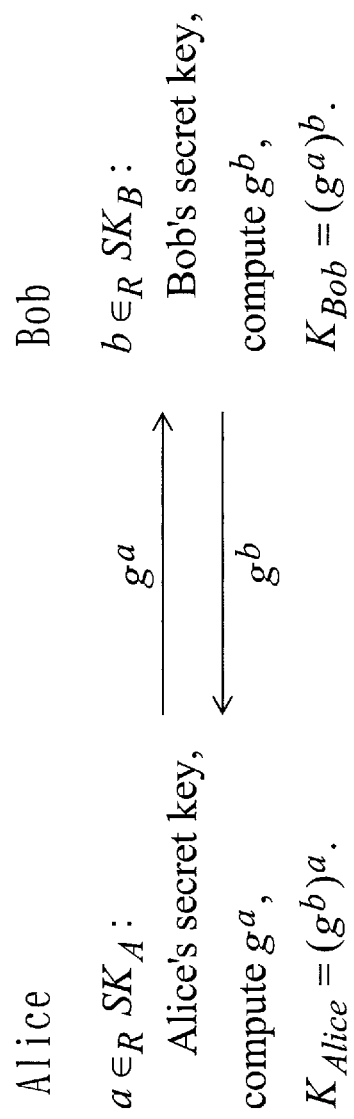
FIG. 4 is a diagram illustrating a simplified version of the algorithm of the SIDH key sharing scheme.

Note that "$g^a$" "$g^b$", "$(g^b)^a$", and "$(g^a)^b$" are defined as follows.

$$g^a:=(E_A: \phi_A(P_B), \phi_A(Q_B)) \in SSEC_{P,A}$$

where $R_A=m_A P_A+n_A Q_A, \phi_A: E \to E_A=E/<R_A>$ $$g^b:=(E^B: \phi_B(P_A), \phi_B(Q_A)) \in SSEC_{P,B}$$

where $R_B=m_B P_B+n_B Q_B, \phi_B: E \to E_B=E/<R_B>$ $$(g^b)^a:=j(E_{BA})$$

where $R_{BA}=m_A\phi_B(P_A)+n_A\phi_B(Q_A), \phi_{BA}: E_B \to E_{BA}=E_B/<R_{BA}>$ $$(g^a)^b:=j(E_{AB})$$

where $R_{AB}=m_B\phi_A(P_B)+n_B\phi_A(Q_B), \phi_{AB}: E_A \to E_{AB}=E_A/<R_{AB}>$ With using the above notation, the SIDH key sharing scheme is described as indicated in FIG. 4.

The public parameters are g=(E; $P_A$, $Q_A$, $P_B$, $Q_B$) and e=($L_A$, $L_B$, $e_A$, $e_B$).

Alice calculates $g^a$ using the secret key a randomly selected from the secret key space $SK_A$. Then, Alice transmits $g^a$ to Bob. Likewise, Bob calculates $g^b$ using a secret key b randomly selected from the secret key space $SK_B$. Then, Bob transmits $g^b$ to Alice.

Alice calculates the shared key $K_{Alice}=(g^b)^a$ using the secret key a and $g^b$ which is transmitted by Bob. Likewise, Bob calculates the shared key $K_{Bob}=(g^a)^b$ using the secret key b, and $g^a$ which is transmitted by Alice. The shared key is given as $K_{Alice}=(g^b)^a=(g^a)^b=K_{Bob}$.

* Description of Configuration *

Figure 5:
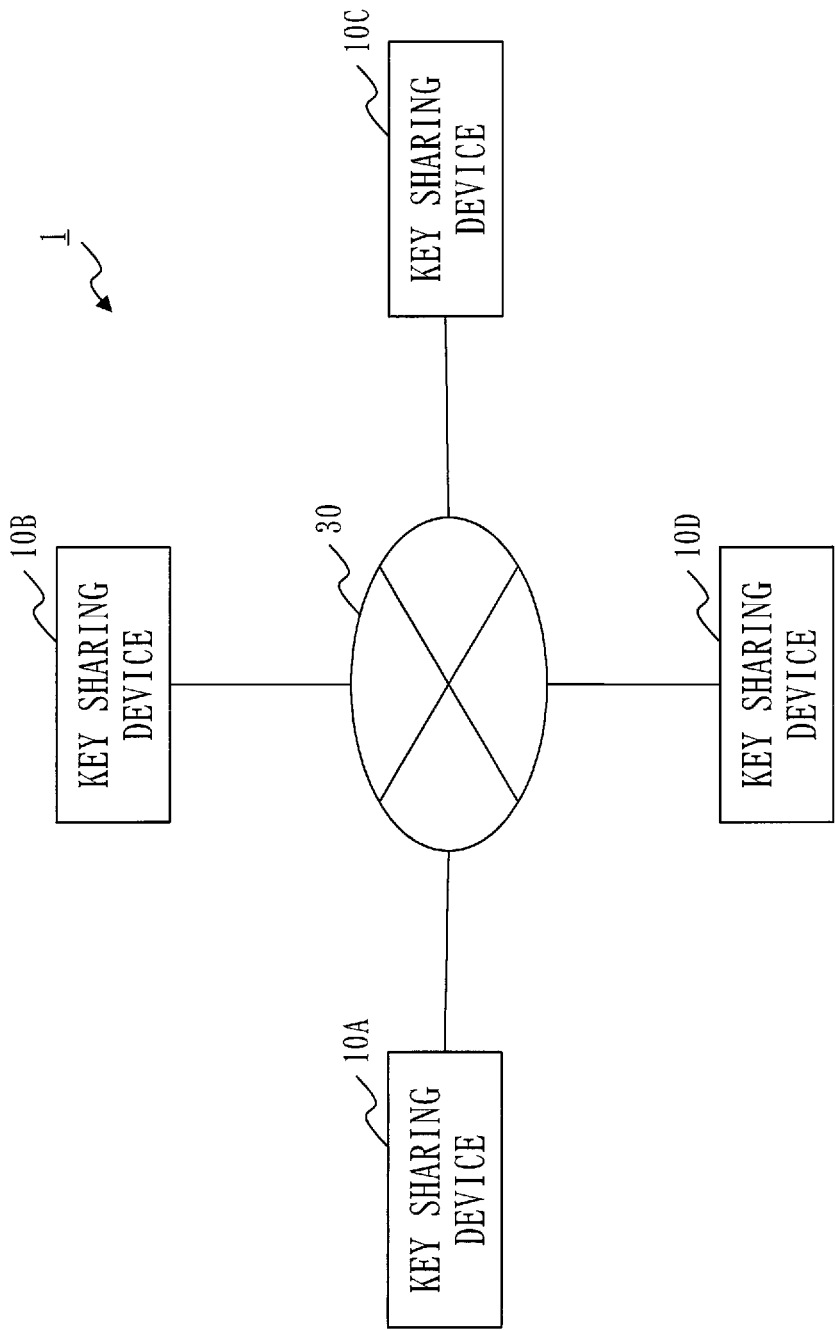
FIG. 5 is a configuration diagram of a key sharing system 1 according to Embodiment 1.

A configuration of a key sharing system 1 according to Embodiment 1 will be described with referring to FIG. 5.

The key sharing system 1 is provided with a plurality of key sharing devices 10. In FIG. 5, the key sharing system 1 is provided with the key sharing devices 10, being key sharing devices 10A to 10D. The key sharing devices 10 are each a computer such as a personal computer (PC) and a smartphone. The key sharing devices 10 are connected to each other via a transmission line 30. The transmission line 30 is the Internet, a local area network (LAN), or the like.

A configuration of the key sharing device 10 according to Embodiment 1 will be described with referring to FIG. 6.

The key sharing device 10 is provided with hardware devices, being a processor 11, a memory 12, a storage 13, and a communication interface 14. The processor 11 is connected to the other hardware devices via a signal line and controls these other hardware devices.

The processor 11 is an integrated circuit (IC) which performs processing. Specific examples of the processor 11 are a central processing unit (CPU), a digital signal processor (DSP), and a graphics processing unit (GPU).

The memory 12 is a storage device which stores data temporarily. Specific examples of the memory 12 are a static random access memory (SRAM) and a dynamic random access memory (DRAM).

The storage 13 is a storage device which stores data. A specific example of the storage 13 is a hard disk drive (HDD). The storage 13 may be a portable recording medium such as a secure digital (SD; registered trademark) memory card, a compact flash (CF; registered trademark), a NAND flash, a flexible disk, an optical disk, a compact disk, a blu-ray (registered trademark), and a digital versatile disk (DVD).

The communication interface 14 is an interface to communicate with an external device. Specific examples of the communication interface 14 are an Ethernet (registered trademark) port, a universal serial bus (USB) port, and a high-definition multimedia interface (HDMI; registered trademark) port.

The key sharing device 10 is provided with a reception unit 21, a key selection unit 22, a key generation unit 23, and a transmission unit 24, as function constituent elements. The key generation unit 23 is provided with a static key generation unit 25, a temporary key generation unit 26, and a shared key generation unit 27. Functions of the individual function constituent elements of the key sharing device 10 are implemented by software.

A program that implements the functions of the individual function constituent elements of the key sharing device 10 is stored in the storage 13. This program is read into the memory 12 by the processor 11 and executed by the processor 11. Hence, the functions of the individual function constituent elements of the key sharing device 10 are implemented.

Figure 6:
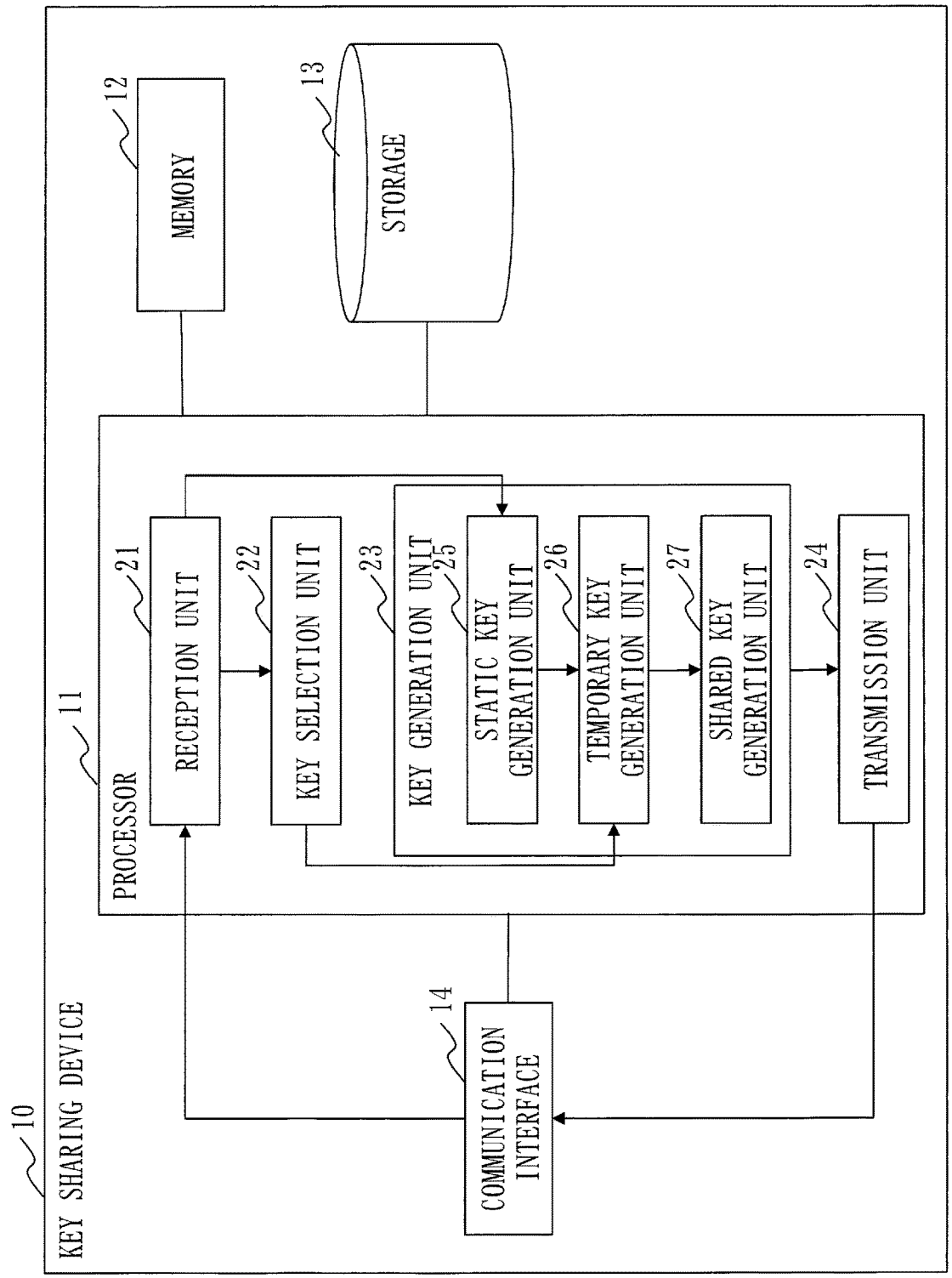
FIG. 6 is a configuration diagram of a key sharing device 10 according to Embodiment 1.

FIG. 6 illustrates only one processor 11. However, a plurality of processors 11 may be employed. The plurality of processors 11 may cooperate to execute the program that implements the functions.

* Description of Behavior *

Figure 7:
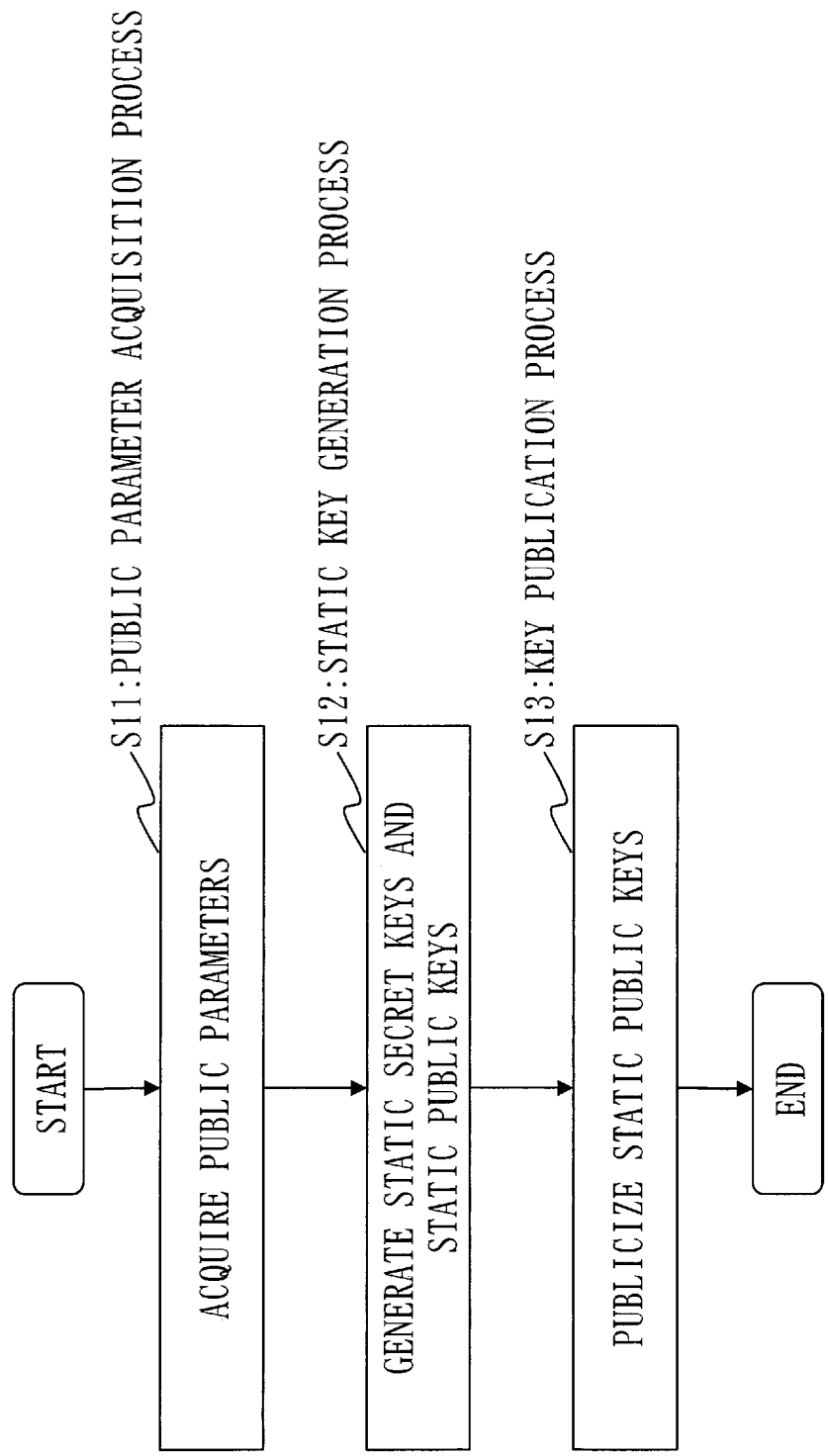
FIG. 7 is a flowchart of a pre-process according to Embodiment 1.
Figure 8:
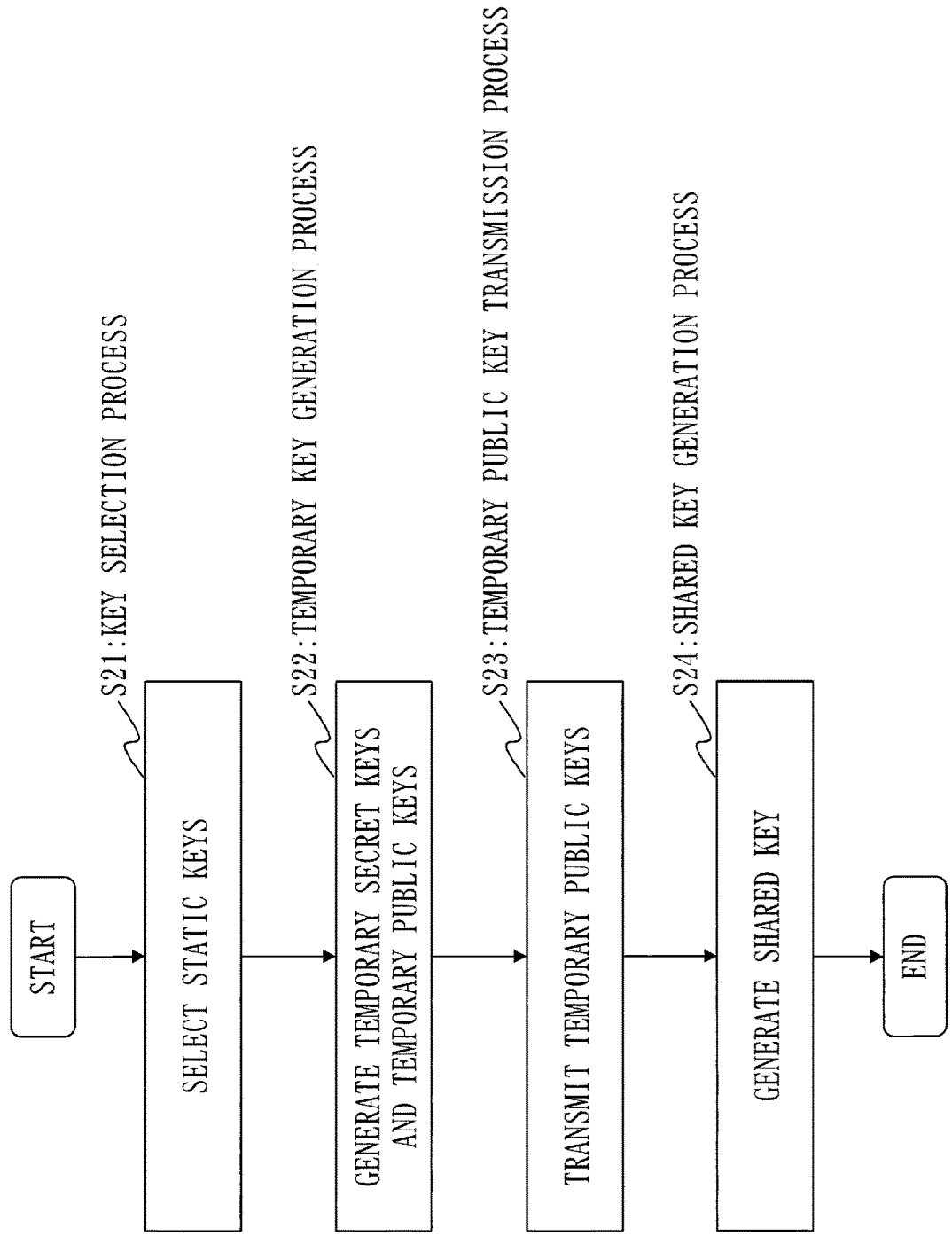
FIG. 8 is a flowchart of a key sharing process according to Embodiment 1.

A behavior of the key sharing system 1 according to Embodiment 1 will be described with referring to FIGS. 7 to 9.

The behavior of the key sharing system 1 according to Embodiment 1 corresponds to a key sharing method according to Embodiment 1. The behavior of the key sharing system 1 according to Embodiment 1 also corresponds to a process of a key sharing program according to Embodiment 1.

The key sharing system 1 uses $g=(E; P_1, Q_1, P_2, Q_2)$ and $e=(L_1, L_2, e_1, e_2)$, as public parameters. Note that indices "A" and "B" in the SIDH key sharing scheme described with referring to FIG. 4 have been changed to "1" and "2", respectively. The public parameters include parameters of two classifications, that is, $(P_1, Q_1)$ based on $L_1$ to the $e_1$-th power and $(P_2, Q_2)$ based on $L_2$ to the $e_2$-th power.

The key sharing system 1 uses the secret key space $SK_1$ and the secret key space $SK_2$. The secret key space $SK_1$ is indicated in Formula 15, is of the same classification as $(P_1, Q_1)$, and is based on $L_1$ to the $e_1$-th power. The secret key space $SK_2$ is indicated in Formula 15, is of the same classification as $(P_2, Q_2)$, and is based on $L_2$ to the $e_2$-th power.

[Formula 15]

$$SK_1:=\{(m_1,n_1)\in(\mathbb{Z}*L_1^{e_1}\mathbb{Z})^2 | \text{ not both divisible by } L_1\},$$

$$SK_2:=\{(m_2,n_2)\in(\mathbb{Z}*L_2^{e_2}\mathbb{Z})^2 | \text{ not both divisible by } L_2\},$$

A pre-process according to Embodiment 1 will be described with referring to FIG. 7.

The pre-process is executed by each key sharing device 10 provided to the key sharing system 1 before a key sharing process to be described later is performed. A description will be made by way of a case where the key sharing device 10A and the key sharing device 10B perform key sharing.

(Step S11: Public Parameter Acquisition Process)

The reception unit 21 acquires public parameters.

Specifically, the reception unit 21 receives, from a publication server, $g=(E; P_1, Q_1, P_2, Q_2)$ and $e=(L_1, L_2, e_1, e_2)$, which are the public parameters, and writes the received public parameters in the memory 12. The public parameters are generated by a management device of the key sharing system 1 and stored in the publication server.

(Step S12: Static Key Generation Process)

The static key generation unit 25 generates static keys based on the public parameters acquired in step S11.

Specifically, in the key sharing device 10A, the static key generation unit 25 reads out the public parameters from the memory 12. The static key generation unit 25 randomly selects elements from the secret key space $SK_1$ to generate a static secret key $a_1=(m_{A,1}, n_{A,1})$. The static key generation unit 25 randomly selects elements from the secret key space $SK_2$ to generate a static secret key $a_2=(m_{A,2}, n_{A,2})$. The static key generation unit 25 also generates a static public key $A_1=g\hat{}a_1$ using the static secret key $a_1$. The static key generation unit 25 generates a static public key $A_2=g\hat{}a_2$ using the static secret key $a_2$. The static key generation unit 25 writes, in the memory 12, a pair of the static secret key $a_1$ and the static public key $A_1$ and a pair of the static secret key $a_2$ and the static public key $A_2$.

Likewise, in the key sharing device 10B, the static key generation unit 25 reads out the public parameters from the memory 12. The static key generation unit 25 randomly selects elements from the secret key space $SK_1$ to generate a static secret key $b_1=(m_{B,1}, n_{B,1})$. The static key generation unit 25 randomly selects elements from the secret key space $SK_2$ to generate a static secret key $b_2=(m_{B,2}, n_{B,2})$. The static key generation unit 25 also generates a static public key $B_1=g\hat{}b_1$ using the static secret key $b_1$. The static key generation unit 25 generates a static public key $B_2=g\hat{}b_2$ using the static secret key $b_2$. The static key generation unit 25 writes, in the memory 12, a pair of the static secret key $b_1$ and the static public key $B_1$, and a pair of the static secret key $b_2$ and the static public key $B_2$.

The pair of the static secret key $a_1$ and the static public key $A_1$, the pair of the static secret key $a_2$ and the static public key $A_2$, the pair of the static secret key $b_1$ and the static public key $B_1$, and the pair of the static secret key $b_2$ and the static public key $B_2$ are each called a static key. The pair of the static secret key $a_1$ and the static public key $A_1$ and the pair of the static secret key $b_1$ and the static public key $B_1$ are elements based on the power of $L_1$ and belong to the same classification as $(P_1, Q_1)$. The pair of the static secret key $a_2$ and the static public key $A_2$, and the pair of the static secret key $b_2$ and the static public key $B_2$ are elements based on the power of $L_2$ and belong to the same classification as $(P_2, Q_2)$.

(Step S13: Key Publication Process)

The transmission unit 24 reads out the static public keys generated in step S12 from the memory 12. The transmission unit 24 then transmits the readout static public keys to the publication server to publicize the static public keys to the key sharing devices 10 provided to the key sharing system 1.

In the case of the key sharing device 10A, the transmission unit 24 reads out the static public key $A_1$ and static public key $A_2$ from the memory 12 and transmits the readout static public key $A_1$ and static public key $A_2$ to the publication server. In the case of the key sharing device 10B, the transmission unit 24 reads out the static public key $B_1$ and static public key $B_2$ from the memory 12 and transmits the readout static public key $B_1$ and static public key $B_2$ to the publication server.

The key sharing process according to Embodiment 1 will be described with referring to FIGS. 8 and 9.

As a premise, assume that the key sharing device 10 acquires the static public keys of the key-sharing counterpart and stores the acquired static public keys in the memory 12.

(Step S21: Key Selection Process)

The key selection unit 22 selects one static key out of two static keys of different classifications.

Specifically, the key selection unit 22 selects, out of two static keys of different classifications, a static key of a classification different from the counterpart. That is, in the key sharing device 10A, between the pair of the static secret key $a_1$ and the static public key $A_1$ and the pair of the static secret key $a_2$ and the static public key $A_2$, the key selection unit 22 selects a pair different from the key sharing device 10B being a key-sharing counterpart. Likewise, in the key sharing device 10B, between the pair of the static secret key $b_1$ and the static public key $B_1$, and the pair of the static secret key $b_2$ and the static public key $B_2$, the key selection unit 22 selects a pair different from the key sharing device 10A being a key-sharing counterpart.

As a specific example, the key selection unit 22 selects one out of two static keys according to whether or not the key sharing device 10 is on a start side that starts key sharing. However, key selection is not limited to this. It suffices as far as different pairs are selected by the different parties according to predetermined rules. The key selection unit 22 writes the selected static keys to the memory 12.

If the key selection unit 22 is in the key-sharing start-side key sharing device 10 (key sharing device 10A), the key selection unit 22 selects the pair of the static secret key $a_1$ and the static public key $A_1$ of the same classification as $(P_1, Q_1)$. If the key selection unit 22 is in the response-side key sharing device 10 (key sharing device 10B) that performs key sharing in response to the start side, the key selection unit 22 selects the pair of the static secret key $b_2$ and the static public key $B_2$ of the same classification as $(P_2, Q_2)$. Which key sharing device 10 is on the start side can be identified by, for example, pre-event communication prior to start of key sharing.

(Step S22: Temporary Key Generation Process)

The temporary key generation unit 26 generates temporary keys of the same classification as that of the static keys selected in step S21.

Specifically, the temporary key generation unit 26 randomly selects elements from the secret key space of the same classification as that of the static keys selected in step S21, to generate a temporary secret key. The temporary key generation unit 26 of the start-side key sharing device 10A randomly selects elements from the secret key space $SK_1$ of the same classification as that of the pair of the static secret key $a_1$ and the static public key $A_1$ to generate a temporary secret key $x=(m_x, n_x)$. The temporary key generation unit 26 of the response-side key sharing device OB randomly selects elements from the secret key space $SK_2$ of the same classification as that of the pair of the static secret key $b_2$ and the static public key $b_2$, to generate a temporary secret key $y=(m_y, n_y)$.

The temporary key generation unit 26 also generates a temporary public key using the temporary secret key. The temporary key generation unit 26 of the start-side key sharing device 10A generates a temporary public key $X=g^x$ using the temporary secret key x. The temporary key generation unit 26 of the response-side key sharing device 10B generates a temporary public key $Y=g^y$ using the temporary secret key y.

The temporary secret key and the temporary public key will be collectively referred to as temporary keys. The temporary key generation unit 26 writes the generated temporary keys to the memory 12.

(Step S23: Temporary Public Key Transmission Process)

The transmission unit 24 transmits the temporary public key generated in step S22 to the key sharing device 10 of the key-sharing counterpart.

Specifically, the transmission unit 24 reads out the temporary public key from the memory 12. The transmission unit 24 transmits the readout temporary public key to the counterpart-side key sharing device 10 via the communication interface 14. The temporary public key is transmitted to the counterpart-side key sharing device 10 via the transmission line 30 and received by the reception unit 21 of the counterpart-side key sharing device 10.

The transmission unit 24 of the start-side key sharing device 10A transmits the temporary public key X to the response-side key sharing device 10B. The reception unit 21 of the key sharing device 10B receives the temporary public key X and writes the received temporary public key X in the memory 12. The response-side key sharing device 10B transmits the temporary public key Y to the start-side key sharing device 10A. The reception unit 21 of the key sharing device 10A receives the temporary public key Y and writes the received temporary public key Y in the memory 12.

(Step S24: Shared Key Generation Process)

The shared key generation unit 27 generates a shared key using the static key selected in step S21, the temporary secret key generated in step S22, the temporary public key generated by the counterpart side in step S23, and the counterpart-side static public key.

Specifically, the shared key generation unit 27 reads out the static key selected in step S21, the temporary secret key generated in step S22, the counterpart-side temporary public key received in step S23, and the counterpart-side static public key from the memory 12. The shared key generation unit 27 then calculates a value $Z_1$, a value $Z_2$, a value $Z_3$, and a value $Z_4$ in the following manner and writes the calculated values $Z_1$ to $Z_4$ in the memory 12.

The shared key generation unit 27 of the start-side key sharing device 10A calculates the values $Z_1$, $Z_2$, $Z_3$, and $Z_4$ as value $Z_1=Y\hat{\,}a_1$, value $Z_2=B_2^x$, value $Z_3=B_2\hat{\,}a_1$, and value $Z_4=Y^x$. The shared key generation unit 27 of the response-side key sharing device 10B calculates the values $Z_1$, $Z_2$, $Z_3$, and $Z_4$ as value $Z_1=A_1^y$, value $Z_2=X\hat{\,}b_2$, value $Z_3=A_1\hat{\,}b_2$, and value $Z_4=X^y$.

Note value $Z_1 = Y\hat{}a_1 = (g^y)\hat{}a_1 = (g\hat{}a_1)^y = A_1^y$, value $Z_2 = B_2^x = (g\hat{}b_2)^x = (g^y)\hat{}b_2 = X\hat{}b_2$, value $Z_3 = B_2\hat{}a_1 = (g\hat{}b_2)\hat{}a_1 = (g\hat{}a_1)\hat{}b_2 = A_1\hat{}b_2$, and value $Z_4 = Y^x = (g^y)^x = (g^x)^y = X^y$. Hence, the values $Z_1$, $Z_2$, $Z_3$, and $Z_4$ calculated by the start-side key sharing device 10A and the values $Z_1$, $Z_2$, $Z_3$, and $Z_4$ calculated by the response-side key sharing device 10B are all equal.

The shared key generation unit 27 generates a common key K using the calculated values $Z_1$, $Z_2$, $Z_3$, and $Z_4$.

In a specific example, the shared key generation unit 27 takes as input the values $Z_1$, $Z_2$, $Z_3$, and $Z_4$ and calculates a hash function H to generate the common key K. In this regard, in addition to the values $Z_1$, $Z_2$, $Z_3$, $Z_4$, the shared key generation unit 27 may also take as input a protocol identifier Π, an identifier A of the start-side key sharing device 10A, an identifier B of the response-side key sharing device 10B, the temporary public key X of the start-side key sharing device 10A, and the temporary public key Y of the response-side key sharing device 10B. That is, the shared key generation unit 27 may calculate the common key K by calculating K=H (Π, $Z_1$, $Z_2$, $Z_3$, $Z_4$, A, B, X, Y).

Modification may be added such as putting together some of the values $Z_1$, $Z_2$, $Z_3$, and $Z_4$ into one value.

* Effect of Embodiment 1 *

As described above, in the key sharing system 1 according to Embodiment 1, static keys of two classifications are prepared, and static keys different from those of the key-sharing counterpart side are used. Thus, a key sharing scheme having asymmetricity can be converted into a key sharing scheme with an authentication function.

Key sharing with an authentication function will be described.

According to a protocol of key sharing with the authentication function, the key-sharing two parties have static public keys of their own and exchange temporary public keys with each other. Each of the key-sharing two parties calculates a shared key based on a counterpart-side static public key, a temporary public key received from the counterpart, a static secret key corresponding to the static public key of its own, and a temporary secret key corresponding to the temporary public key of its own.

The static public key and the static secret key will be collectively referred to as static keys. The static keys are keys that are not changed over a long period of time. The temporary public key and the public secret key will be collectively referred to as temporary keys. The temporary keys are keys that are used temporarily in generation of the shared key. The shared key is a key that is shared between the two parties.

According to the protocol of key sharing with the authentication function, the shared key is calculated with using the counterpart-side static public key. The static public key is a key that is not changed over a long period of time. Therefore, a key-sharing counterpart can be identified.

The key sharing system 1 according to Embodiment 1 can implement a 1-round key sharing scheme with an authentication function by converting the SIDH key sharing scheme.

An explanation will be made on "1 round".

The term "1 round" is used to signify that key-sharing two parties can transmit a message independently and simultaneously. That is, "1 round" signifies that it is unnecessary to perform reciprocal communication in which, of two parties, one party sends a message to the other party, and upon reception of this message, the other party returns a message to one party. When the reciprocal communication is necessary, this situation is called "2 pass". By implementing a 1-round key sharing scheme with an authentication function, the key sharing device 10 can calculate temporary keys before start of key sharing. Moreover, the key sharing devices 10 that perform key sharing can exchange temporary keys with each other simultaneously. Hence, key sharing can be performed efficiently.

A key sharing scheme with an authentication function which is implemented by a method described in a literature "Fujioka, A., Suzuki, K., Xagawa, K., Yoneyama, K.: Strongly secure authenticated key exchange from factoring, codes, and lattices. Des. Codes Cryptography 76(3), 469-504 (2015), a preliminary version appeared in PKC 2012 (2012)" requires reciprocal communication, and accordingly is not a 1-round key sharing scheme with an authentication function.

The key sharing scheme with the authentication function, which is implemented by the key sharing system 1 according to Embodiment 1, is a scheme implemented with a single elliptic curve. Hence, the data to be communicated can be downsized as compared to the key sharing scheme described in the above literature. That is, an efficient key sharing scheme can be implemented.

In the key sharing system 1 according to Embodiment 1, static keys of two classifications are prepared and are selectively used according to whether the party is the start side or the reply side. Therefore, the key sharing scheme with the authentication function implemented by the key sharing system 1 according to Embodiment 1 is resistant to a replay attack, which is a method of attacking an authentication system. A literature "Tanenbaum, A. S.: Computer Networks. Pearson (2002)" includes description on the reply attack.

The key sharing scheme with the authentication system, which is implemented by the key sharing system 1 according to Embodiment 1, can not only ensure security for a quantum computer but also prove security in a quantum random oracle model.

* Other Configurations *

Modification 1

Embodiment 1 describes an SIDH key sharing scheme as an example of a key sharing scheme having asymmetricity. However, the asymmetric key sharing system is not limited to the SIDH key sharing scheme. Another asymmetric key sharing scheme can be converted into a key sharing scheme with an authentication function by applying a technique of preparing two static keys and using one static key being different from that of a key-sharing counterpart. If the key sharing scheme as the technique application target is a quantum-resistant scheme, the key sharing scheme with the authentication function, which is obtained by conversion, is also possibly a quantum-resistant scheme.

Modification 2

In Embodiment 1, the function constituent elements are implemented by software. Alternatively, in Modification 2, function constituent elements may be implemented by hardware. Modification 2 will be described regarding its differences from Embodiment 1.

Figure 10:
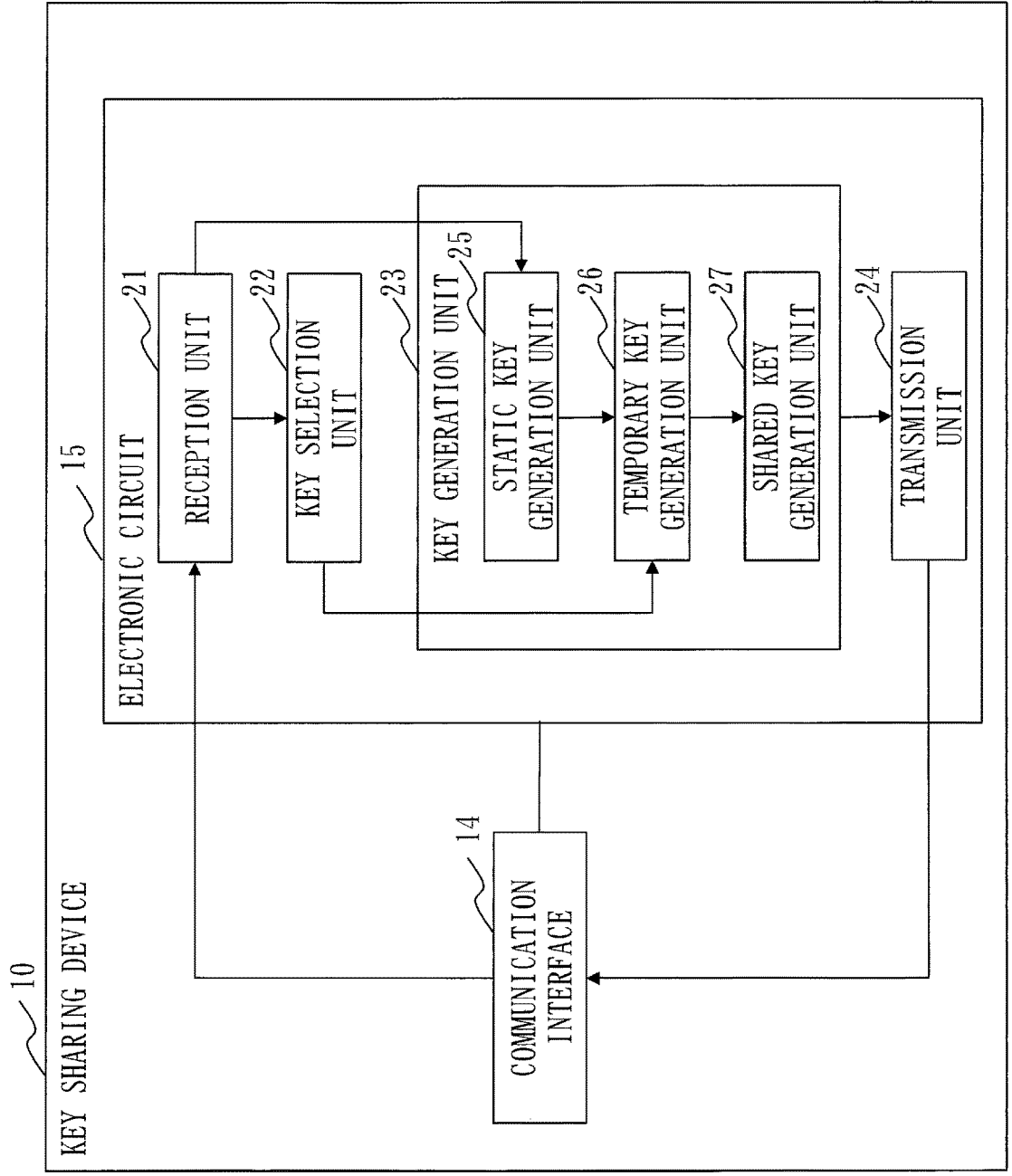
FIG. 10 is a configuration diagram of a key sharing device 10 according to Modification 2.

A configuration of a key sharing device 10 according to Modification 2 will be described with referring to FIG. 10.

When the function constituent elements are implemented by hardware, the key sharing device 10 is provided with an electronic circuit 15 in place of a processor 11, a memory 12, and a storage 13. The electronic circuit 15 is a dedicated circuit that implements functions of the functional constituent elements, a function of the memory 12, and a function of the storage 13.

It is assumed that the electronic circuit 15 is a single circuit, a composite circuit, a programmed processor, a parallel-programmed processor, a logic IC, a gate array (GA), an application specific integrated circuit (ASIC), or a field-programmable gate array (FPGA).

The function constituent elements may be implemented by one electronic circuit 15, or by a plurality of electronic circuits 15 by dispersion.

Modification 3

In Modification 3, some of the function constituent elements may be implemented by hardware and the remaining function constituent elements may be implemented by software.

The processor 11, the memory 12, the storage 13, and the electronic circuit 15 are referred to as processing circuitry. That is, functions of the function constituent elements are implemented by the processing circuitry.

REFERENCE SIGNS LIST

10: key sharing device; 11: processor, 12: memory; 13: storage; 14: communication interface; 15: electronic circuit; 21: reception unit; 22: key selection unit; 23: key generation unit; 24: transmission unit; 25: static key generation unit; 26: temporary key generation unit; 27: shared key generation unit; 30: transmission line.

The invention claimed is:

1. A key sharing device comprising:
processing circuitry
to select a static key out of two static keys generated from respective secret key spaces of different classifications according to whether or not the key sharing device is on a start side that starts key sharing, the two static keys including a pair of a public key $A_1$ and a secret key $a_1$, and a pair of a public key $A_2$ and a secret key $a_2$, the public key $A_1$, the secret key $a_1$, the public key $A_2$, and the secret key $a_2$ being indicated in Formula 1, the static key to be selected being generated from a secret key space of a classification different from that of a secret key space from which a static key selected by a counterpart is generated, the two static keys being generated consistent with the supersingular isogeny Diffie-Hellman (SIDH) key sharing scheme,
to generate a temporary key from the secret key space of the same classification as that of the selected static key and which is indicated in Formula 2, and
to generate a shared key to be shared with the counterpart, using the selected static key and a temporary key generated by the counterpart from a secret key space of a same classification as the static key selected by the counterpart, such that the shared key is generated as a result of executing a 1-round key sharing scheme with an authentication function between the key sharing device and the counterpart,
wherein
$SK_1$ represents the secret key space from which the secret key $a_1$ is randomly selected,
$SK_2$ represents the secret key space from which the secret key $a_2$ is randomly selected,
$SSECP_P$ represents a set of supersingular elliptic curves,
g represents a set of public parameters including a supersingular elliptic curve E from $SSEC_P$ and points $P_1$, $Q_1$, $P_2$, and $Q_2$ on the supersingular elliptic curve E selected as generators,
$SSEC_{P,1}$ and $SSEC_{P,2}$ represent respective subsets of supersingular elliptic curves from $SSEC_P$ with an auxiliary torsion basis,
$E_1$ represents a supersingular elliptic space calculated from $SSEC_{P,1}$ on the basis of the secret key $a_1$, and $\phi_1$ represents an isogeny calculated on the basis of the secret key $a_1$,
$E_2$ represents a supersingular elliptic space calculated from $SSEC_{P,2}$ on the basis of the secret key $a_2$, and $\phi_2$ represents an isogeny calculated on the basis of the secret key $a_2$,
the temporary key generated in Formula 2 includes a pair of a temporary public key X and a temporary secret key x, the temporary secret key x being randomly selected from the secret key space $SK_1$, and
Formula 1 and Formula 2 are defined below $$a_1:=(m_{A,1},n_{A,1})\in_R SK_1:=\{(m_1,n_1)\in(\mathbb{Z}/L_1^{e_1}\mathbb{Z})^2\}, \quad \text{[Formula 1]}$$

$$a_2:=(m_{A,2},n_{A,2})\in_R SK_2:=\{(m_2,n_2)\in(\mathbb{Z}/L_2^{e_2}\mathbb{Z})^2\},$$

$$A_1=g^{a_1},$$

$$A_2=g^{a_2},$$

$$g:=(E;P_1,Q_1,P_2,Q_2),$$

$$SSEC_P:=\{\text{supersingular ellitic curve E over } \mathbb{F}_{p^2}$$

$$\text{with } E(\mathbb{F}_{p^2})\simeq(\mathbb{Z}/(p\pm1)\mathbb{Z})^2\supseteq(\mathbb{Z}/L_1^{e_1}\mathbb{Z})^2\oplus(\mathbb{Z}/L_2^{e_2}\mathbb{Z})^2\},$$

$$SSEC_{P,1}:=\{(E;P_2',Q_2')|E\in SSEC_P,(P_2',Q_2'): \text{basis of } E[L_2^{e_2}]\},$$

$$SSEC_{P,2}:=\{(E;P_1',Q_1')|E\in SSEC_P,(P_1',Q_1'): \text{basis of } E[L_1^{e_1}]\},$$

$$g^{a_1}:(E_1;\phi_1(P_2),\phi_1(Q_2))\in SSEC_{P,1},$$

where $R_1=m_1P_1+n_1Q_1, \phi_1: E\to E_1=E/\langle R_1\rangle$, $$g^{a_2}:=(E_2;\phi_2(P_1),\phi_2(Q_1))\in SSEC_{P,2},$$

where $R_2=m_2P_2+n_2Q_2, \phi_2: E\to E_2=E/\langle R_2\rangle$, $$p\pm1=f\cdot L_1^{e_1}L_2^{e_2},$$

$L_1$ and $L_2$ are small primes, $$L_1^{e_1}\approx L_2^{e_2}$$

$$X=g^x,$$

$$x:=(m_x,n_x)\in_R SK_1. \quad \text{[Formula 2]}$$

2. The key sharing device according to claim 1,
wherein the processing circuitry generates the shared key using the temporary key generated by the counterpart,
the counterpart generates a static key including a pair of a public key $B_2$ and a secret key $b_2$, the secret key $b_2$ being indicated in Formula 4, the secret key $b_2$ being randomly selected from the space $SK_2$,
the temporary key generated by the counterpart includes a temporary public key Y and a temporary secret key y as indicated in Formula 3, the temporary secret key y being randomly selected from the secret key space $SK_2$, the shared key is calculated based on a value $Z_1$, a value $Z_2$, a value $Z_3$, and a value $Z_4$ which are indicated in Formula 4, and Formula 3 and Formula 4 are defined below $$Y = g^y,$$

$$y := (m_y, n_y) \in_R SK_2 \quad \text{[Formula 3]}$$

$$Z_1 = Y^{a1},$$

$$Z_2 = B_2^{\ x},$$

$$Z_3 = B_2^{\ a1},$$

$$Z_4 = Y^x,$$

$$B_2 = g^{b2},$$

$$b_2 := (m_{B,2}, n_{B,2}) \in_R SK_2 = \{(m_2, n_2) \in (\mathbb{Z}/L_2^{e2}\mathbb{Z})^2\} \quad \text{[Formula 4]}$$

3. A key sharing method comprising:

selecting a static key out of two static keys generated from respective secret key spaces of different classifications according to whether or not the key sharing method is on a start side that starts key sharing, the two static keys including a pair of a public key $A_1$ and a secret key $a_1$, and a pair of a public key $A_2$ and a secret key $a_2$, the public key $A_1$, the secret key $a_1$, the public key $A_2$, and the secret key $a_2$ being indicated in Formula 5, the static key to be selected being generated from a secret key space of a classification different from that of a secret key space from which a static key selected by a counterpart is generated, the two static keys being generated consistent with the supersingular isogeny Diffie-Hellman (SIDH) key sharing scheme;

generating a temporary key from the secret key space of the same classification as that of the selected static key and which is indicated in Formula 6; and generating a shared key to be shared with the counterpart, using the selected static key and a temporary key generated by the counterpart from a secret key space of a same classification as the static key selected by the counterpart, such that the shared key is generated as a result of executing a 1-round key sharing scheme with an authentication function between the key sharing device and the counterpart, wherein $SK_1$ represents the secret key space from which the secret key $a_1$ is randomly selected, $SK_2$ represents the secret key space from which the secret key $a_2$ is randomly selected, $SSEC_P$ represents a set of supersingular elliptic curves, g represents a set of public parameters including a supersingular elliptic curve E from $SSEC_P$ and points $P_1$, $Q_1$, $P_2$, and $Q_2$ on the supersingular elliptic curve E selected as generators, $SSEC_{P,1}$ and $SSEC_{P,2}$ represent respective subsets of supersingular elliptic curves from $SSEC_P$ with an auxiliary torsion basis, $E_1$ represents a supersingular elliptic space calculated from $SSEC_{P,1}$ on the basis of the secret key $a_1$, and $\phi_1$ represents an isogeny calculated on the basis of the secret key $a_1$, $E_2$ represents a supersingular elliptic space calculated from $SSEC_{P,2}$ on the basis of the secret key $a_2$, and $\phi_2$ represents an isogeny calculated on the basis of the secret key $a_2$, the temporary key generated in Formula 6 includes a pair of a temporary public key X and a temporary secret key x, and Formula 5 and Formula 6 are defined below $$a_1 := (m_{A,1}, n_{A,1}) \in_R SK_1 := \{(m_1, n_1) \in (\mathbb{Z}/L_1^{e1}\mathbb{Z})^2\}, \quad \text{[Formula 5]}$$

$$a_2 := (m_{A,2}, n_{A,2}) \in_R SK_2 := \{(m_2, n_2) \in (\mathbb{Z}/L_2^{e2}\mathbb{Z})^2\},$$

$$A_1 = g^{a1},$$

$$A_2 = g^{a2},$$

$$g := (E; P_1, Q_1, P_2, Q_2),$$

$SSEC_P := \{$supersingular ellitic curve E over $\mathbb{F}_{p^2}$ with $E(\mathbb{F}_{p^2}) \simeq (\mathbb{Z}/(p\pm 1)\mathbb{Z})^2 \supseteq (\mathbb{Z}/L_1^{e1}\mathbb{Z})^2 \oplus (\mathbb{Z}/L_2^{e2}\mathbb{Z})^2\},$ $SSEC_{P,1} := \{(E; P_2', Q_2') | E \in SSEC_P, (P_2', Q_2'): \text{basis of } E[L_2^{e2}]\},$ $SSEC_{P,2} := \{(E; P_1', Q_1') | E \in SSEC_P, (P_1', Q_1'): \text{basis of } E[L_1^{e1}]\},$ $$g^{a1} := (E_1; \phi_1(P_2), \phi_1(Q_2)) \in SSEC_{P,1},$$

where $R_1 = m_1 P_1 + n_1 Q_1, \phi_1: E \to E_1 = E/\langle R_1 \rangle,$ $$g^{a2} := (E_2; \phi_2(P_1), \phi_2(Q_1)) \in SSEC_{P,2},$$

where $R_2 = m_2 P_2 + n_2 Q_2, \phi_2: E \to E_2 = E/\langle R_2 \rangle,$ $$p \pm 1 = f \cdot L_1^{e1} L_2^{e2},$$

$L_1$ and $L_2$ are small primes, $$L_1^{e1} \approx L_2^{e2}$$

$$X = g^x,$$

$$x := (m_x, n_x) \in_R SK_1. \quad \text{[Formula 6]}$$

4. A non-transitory computer-readable medium storing a key sharing program which causes a computer to execute:

a key selection process of selecting a static key out of two static keys generated from respective secret key spaces of different classifications according to whether or not the key sharing program is on a start side that starts key sharing, the two static keys including a pair of a public key $A_1$ and a secret key $a_1$, and a pair of a public key $A_2$ and a secret key $a_2$, the public key $A_1$, the secret key $a_1$, the public key $A_2$, and the secret key $a_2$ being indicated in Formula 7, the static key to be selected being generated from a secret key space of a classification different from that of a secret key space from which a static key selected by a counterpart is generated, the two static keys being generated consistent with the supersingular isogeny Diffie-Hellman (SIDH) key sharing scheme;

a temporary key generation process of generating a temporary key from the secret key space of the same classification as that of the static key selected by the key selection process and which is indicated in Formula 8; and a shared key generation process of generating a shared key to be shared with the counterpart, using the static key selected by the key selection process and a temporary key generated by the counterpart from a secret key space of a same classification as the static key selected by the counterpart, such that the shared key is generated as a result of executing a 1-round key sharing scheme with an authentication function between the key sharing device and the counterpart, wherein $SK_1$ represents a secret key space from which the secret key $a_1$ is randomly selected, $SK_2$ represents a secret key space from which the secret key $a_2$ is randomly selected, $SSEC_P$ represents a set of supersingular elliptic curves, g represents a set of public parameters including a supersingular elliptic curve E from $SSEC_P$ and points $P_1$, $Q_1$, $P_2$, and $Q_2$ on the supersingular elliptic curve E selected as generators, $SSECP_{P,1}$ and $SSEC_{P,2}$ represent respective subsets of supersingular elliptic curves from $SSEC_P$ with an auxiliary torsion basis, $E_1$ represents a supersingular elliptic space calculated from $SSECP_{P,1}$ on the basis of the secret key $a_1$, and $\phi_1$ represents an isogeny calculated on the basis of the secret key $a_1$, $E_2$ represents a supersingular elliptic space calculated from $SSEC_{P,2}$ on the basis of the secret key $a_2$, and $\phi_2$ represents an isogeny calculated on the basis of the secret key $a_2$, the temporary key generated in Formula 8 includes a pair of a temporary public key X and a temporary secret key x, the temporary secret key x being randomly selected from the secret key space $SK_1$, and Formula 7 and Formula 8 are defined below $$a_1:=(m_{A,1},n_{A,1})\in_R SK_1:=\{(m_1,n_1)\in(\mathbb{Z}/L_1^{e_1}\mathbb{Z})^2\}, \quad [\text{Formula 7}]$$

$$a_2:=(m_{A,2},n_{A,2})\in_R SK_2:=\{(m_2,n_2)\in(\mathbb{Z}/L_2^{e_2}\mathbb{Z})^2\},$$

$$A_1=g^{a_1},$$

$$A_2=g^{a_2},$$

$$g:=(E;P_1,Q_1,P_2,Q_2),$$

$SSEC_P:=\{$supersingular ellitic curve E over $\mathbb{F}_{p^2}$ with $E(\mathbb{F}_{p^2})\simeq(\mathbb{Z}/(p\pm 1)\mathbb{Z})^2\supseteq(\mathbb{Z}/L_1^{e_1}\mathbb{Z})^2\oplus(\mathbb{Z}/L_2^{e_2}\mathbb{Z})^2\}$, $SSEC_{P,1}:=\{(E;P_2',Q_2')|E\in SSEC_P,(P_2',Q_2'):$ basis of $E[L_2^{e_2}]\}$, $SSEC_{P,2}:=\{(E;P_1',Q_1')E\in SSEC_P,(P_1',Q_1'):$ basis of $E[L_1^{e_1}]\}$, $g^{a_1}:=(E_1;\phi_1(P_2),\phi_1(Q_2))\in SSEC_{P,1}$, where $R_1=m_1P_1+n_1Q_1, \phi_1: E\rightarrow E_1=E/\langle R_1\rangle$, $g^{a_2}:=(E_2;\phi_2(P_1),\phi_2(Q_1))\in SSEC_{P,2}$, where $R_2=m_2P_2+n_2Q_2, \phi_2: E\rightarrow E_2=E/\langle R_2\ \mathbb{F}$, $p\pm 1=f\cdot L_1^{e_1}L_2^{e_2}$, $L_1$ and $L_2$ are small primes, $L_1^{e_1}\approx L_2^{e_2}$ $X=g^x$, $$x:=(m_x,n_x)\in_R SK_1. \quad [\text{Formula 8}]$$

* * * * *